United States Patent [19]

Cassani et al.

[11] Patent Number: 4,902,957
[45] Date of Patent: Feb. 20, 1990

[54] DC/DC CONVERTER

[75] Inventors: John C. Cassani; Mark K. DeMoor; Paul W. Graf; Jonathan J. Hurd, all of Lexington; Christopher D. Jones, Georgetown; Stephen F. Newton, Winchester; David R. Thomas, Cynthiana, all of Ky.

[73] Assignee: International Business Machines Corporation, Armonk, N.Y.

[21] Appl. No.: 344,182

[22] Filed: Apr. 27, 1989

[51] Int. Cl.$^4$ .................... G05F 1/613; H02M 3/335
[52] U.S. Cl. .................................. 323/222; 323/285
[58] Field of Search ............. 323/222, 282, 283, 284, 323/285

[56] References Cited

U.S. PATENT DOCUMENTS

| 3,784,893 | 1/1975 | Rando | 363/54 |
|---|---|---|---|
| 3,879,647 | 4/1975 | Hamilton et al. | 363/16 |
| 4,672,518 | 6/1987 | Murdock | 323/285 |
| 4,674,020 | 6/1987 | Hill | 323/222 |
| 4,683,529 | 7/1987 | Bucher, II | 323/222 |
| 4,712,169 | 12/1987 | Albach | 323/222 |
| 4,814,684 | 3/1989 | McCurdy | 323/222 |

OTHER PUBLICATIONS

IBM Technical Disclosure Bulletin article entitled "Improved Switch Mode Power Supply Regulation by Eliminating Turn-off Spikes" vol. 31, No. 4, Sep. 1988, at pp. 97–98.
Siliconex Incorporated sales literature for Switchmode Controllers Si9110/Si9111.

Primary Examiner—Peter S. Wong
Attorney, Agent, or Firm—John A. Brady

[57] ABSTRACT

A latch (29) is set by a clock (33) to turn on power switch (FET 5). The latch (29) is reset by high voltage comparator (21), by a 50 percent clock delay (35) and by a low-voltage-to-charging-current comparator (19). The voltage at turn-on is compared with a up-ramping reference (15) until it equals an operating reference (17). A temporary delay (pulse circuit 39 and gate 37) is provided before the low voltage comparison can be effective. The delay prevents response to parasitic effects across the power switch (5). Excess drive is prevented resulting from low output currents and malfunctions, and at turn-on.

4 Claims, 1 Drawing Sheet

DC/DC CONVERTER

DESCRIPTION

1. Technical Field

A direct current to direct current (DC/DC) converter produces a steady-state voltage useful as a power source for circuitry from an input voltage, generally a steady-state voltage which may not be useful as a power source for circuitry because it is poorly regulated or otherwise unreliable. The DC/DC converter changes the voltage level from that of the DC input voltage and produces an output DC voltage which is not subject to unacceptable variations during use.

2. Background Art

A typical, known DC/DC converter to which this invention is directed is controlled by the setting and resetting of a latch which gates a power field effect transistor (FET) and sense FET. Parasitic voltages and currents around the sense FET cause the sensing of the sense FET to be unreliable. A broadly similar phenomenon is addressed in the *IBM Technical Disclosure Bulletin* article entitled "Improved Switch Mode Power Supply Regulation by Eliminating Turn-Off Spikes" Vol. 31, No. 4, September 1988, at pp. 97–98, where such disturbances are diverted by circuitry. In accordance with this invention provision is also made not to allow such initial disturbances to control the latch.

A second problem occurs when the load is low since delays in the control loop become unacceptable. In accordance with invention a control operating on a low load reference voltage is employed.

A third problem is protecting the power FET from excessive current. In accordance with this invention the latch is reset by a signal from the clock delayed one-half cycle, thus absolutely limiting the duty cycle to no more than 50 percent. Limiting the duty cycle for such a purpose is believed to be broadly conventional. Siliconix Incorporated states in its sale literature with respect to its Switchmode Controllers Si9110/Si9111 that a frequency divider in its logic section limits switch duty cycle to less than or equal to 50 percent.

A fourth problem is in preventing excessive operation at turn-on, when the output signal is much lower than the reference signal to which it is compared during normal operation. In accordance with this invention, a ramp reference signal is employed at turn-on. U.S. Pat. No. 3,879,647 to Hamilton et al has a broadly similar ramp control and it is otherwise generally similar to this invention.

U.S. Pat. No. 3,784,893 to Rando is also generally similar, but not closely similar, to this invention.

DESCRIPTION OF INVENTION

This invention is a DC/DC converter suitable for on-chip implementations. It comprises several enhancements to a known converter architecture. The known architecture comprises a power train having an inductance in series with the load and an inductance in parallel with a transistor switch. The output voltage is sensed and the current through the switch is sensed. The output voltage is compared to a reference voltage to obtain an error voltage. That error voltage is compared with a voltage corresponding to the sensed current, and the result is used to reset a latch. The latch, when set, closes the switch and, when reset, opens the switch. A clock periodically sets the switch. The enhancements comprise the following: resetting the latch at 50 percent delay of the clock to prevent overloads by limiting the duty cycle to 50 percent; resetting the latch at comparison of a low-load voltage reference and the error voltage to limit voltages at low loads; not responding to the output of the comparison of the error voltage and the voltage corresponding to the sensed current during initial turn on to eliminate parasitic effects; and comparing at turn-on the output voltage with a ramp-up voltage so that the output voltage is initially based on the ramp-up voltage.

BRIEF DESCRIPTION OF THE DRAWING

The details of this invention will be described in connection with the accompanying drawing, in which.

BEST MODE FOR CARRYING OUT THE INVENTION

Figure 1:
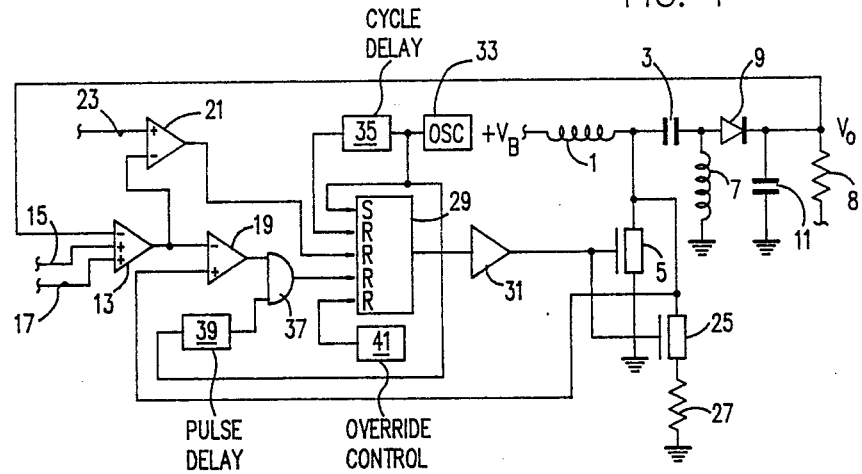
FIG. 1 is an illustrative diagram of the elements of a preferred embodiment and FIG. 2 is alternate circuitry for avoiding response to parasitic effects across the sense FET.

A preferred DC/DC converter in accordance with this invention is shown in FIG. 1, the circuit elements being shown illustratively as they are widely known and available. A positive input DC voltage $+V_B$ is applied to one side of inductor 1. The opposite side of inductor 1 is connected to one side of capacitor 3, and the junction of inductor 1 and capacitor 3 is connected to a power FET 5 (actually comprising a large group of field effect transistors connected in parallel to function as a power FET as is conventional).

The opposite side of capacitor 3 is connected to inductor 7, the opposite side of which is connected to ground. The junction of capacitor 3 and inductor 7 is connected to the anode of a high-current diode 9, the negative terminal of which is connected through capacitor 11 to ground. Elements 3, 7, 9 and 11 form a conventional voltage converter.

Resistor 8 is symbolic of the output load. $V_o$ represents the direct current output voltage, which appears at the junction of diode 9 and resistor 8. This configuration is generally known as a power train and is widely understood and therefore will not be discussed in particular detail. The potential $V_B + V_o$ appears across FET 5.

$V_o$ is connected to the minus terminal of error amplifier 13. Amplifier 13 compares plus and minus input signals to it and produces an output signal (error voltage) directly proportional to the magnitude of the difference. As conventional and is the meaning throughout the description of this invention, a minus terminal produces a falling of output when the signal on the minus terminal is greater than the signal on a plus terminal to the same device. The other two inputs of amplifier 13, both to positive inputs, are a linear ramp voltage 15, appearing at start-up, and an operating reference voltage 17.

The output of amplifier 13 is connected as the minus input of comparator 19 and also as the minus input of comparator 21. The plus input of comparator 21 is low-load reference voltage 23. The plus input of comparator 19 is connected to FET current sense 25, which is shown illustratively. A specific implementation of current sense 25 is the well known use of a small proportion of all the large number field effect transistors forming power FET 5 as sensing devices by connecting a small resistor for sensing just to those transistors and sensing the voltage across those resistors. That configuration is what is suggested by the drawing with the resistor 27 being illustrative of the small resistors.

Latch 29, when in the set condition, activates driver 31 to apply a signal to the gate of FET 5 turning on FET 5. FET 5 when on acts as a closed, low resistance path sufficient to carry all current in normal operation to ground from the junction of inductor 1 and capacitor 3. Latch 29 has one set input, connected to clock 33, and four reset inputs.

One of the reset inputs of latch 29 is connected to the output of one-half cycle delay circuit 35 with the input of that circuit being connected from clock 33. A second reset input receives the output of comparator 21.

A third reset input receives the output of AND gate 37. AND gate 37 has two inputs, one of which receives the output of comparator 19 and the other of which receives the output of pulse circuit 39. Pulse circuit 39 receives its input from clock 33 and produces a low level output predetermined to be longer than the parasitic effects across FET 5, after which pulse circuit 39 reconditions gate 37 to pass the signal from comparator 19 which exists when the current sense signal on the plus input predominates over the error signal from amplifier 13.

The final reset input is from an override control 41 produced externally of the circuit as shown. This permits the converter to be shut down for safety or other reasons non-operating conditions.

In normal operation, clock 33 has a constant operating frequency, which sets latch 29 at the beginning of each interval. The set status of latch 29 activates driver 31 to switch power FET 5 on, as well as current sense 25.

The magnitude of current through FET 5, assuming no parasitic effects, is related to the increasing of the converter output voltage $V_o$. $V_o$ is compared in normal operation with reference voltage 17 in amplifier 13 to produce an output which increases in proportion to $V_o$ being lower than the reference and decreases in proportion to $V_o$ being higher than the reference.

The output of amplifier 13 is compared to low-load reference voltage 23 in comparator 21, and when the output of amplifier 13 is lower, the output of comparator 21 resets latch 29, thereby switching off FET 5 and terminating the increasing of the converter output voltage.

The output of amplifier 13 is compared to the current sense 25 at comparator 19, and when the output current sense 25 is higher, the output conditions gate 37. Gate 37 is also conditioned by pulse circuit 39 after the predetermined delay in circuit 39 initiated by clock 33. When gate 37 is conditioned by both inputs to it, the output of gate 37 resets latch 29, thereby switching off FET 5 and terminating the increasing of the converter output voltage. This cycle is initiated again by clock 33 setting latch 29 at the next regular interval.

PREVIOUS DEFICIENCIES

The previously known circuit of this overall design does not have comparator 21, delay 35, pulse circuit 39 or ramp reference voltage 15. Deficiencies in the known circuit include the following: At the beginning of each cycle, latch 29 is set and turns on FET 5. As the current in FET 5 rises the current sense 25 voltage rises until it is slightly greater than the output of amplifier 13. At that point, the latch 29 is normally reset and FET 5 is turned off. Current in FET 5 is the sum of the output current in the load and the current supplied by the bulk supply, $V_B$. This cycle is repeated at the clock frequency and all delays in the high speed current loop are undesirable. The output voltage $V_o$ is fed back to amplifier 13. The output of amplifier 13 determines the maximum current allowed to flow in FET 5. For large amplifier 13 outputs, FET 5 current must reach a higher value before comparator 19 resets latch 29, which shuts driver 31 off.

Numerous problems exist with this control scheme. First, a large spike occurs across the current sense 25 as FET 5 turns on because of parasitic capacitances and inductances in the circuit. This spike normally resets latch 29 and turns FET 5 off too early. This causes the output voltage, $V_o$, to drop, eventually causing the output of amplifier 13 to increase resulting in too high a current being permitted in FET 5. The output of amplifier 13 eventually rises high enough so that premature turn off would not occur and $V_o$ would increase. When $V_o$ rises above the reference voltage 15, the premature shutdown situation re-occurs and oscillation of $V_o$ results. Previous solutions to this problem involve placing a low pass filter in the current sense 25 path. This adds significant delay and is undesirable if a high frequency converter is desired.

A second problem with the known converter occurs when the load current is low. Since the output of amplifier 13 controls the current in the FET 5, the output of amplifier 13 decreases with low load current. With no load, the current of FET 5 needs to be a small value. That is, the output of amplifier 13 needs to be just above ground and FET 5 is required to turn off immediately after being turned on. The non-zero delay time in the loop from current sense 25 prevents this from happening and the output voltage rises above an acceptable limit. The current sense loop delay determines the output load current at which regulation becomes a problem.

A third characteristic of the known converter, relates to the maximum amount of current allowed to flow in FET 5. The output of amplifier 13 controls the current flow and must be clamped to a safe level to prevent destruction of FET 5 and other power train components. However, if a failure occurs in the current sensing loop and FET 5 is not turned off, the maximum current in the FET will be determined by the bulk voltage, $V_B$, divided by the input inductor 1 winding resistance. This could result in massive destruction of the power train even with no load on the output. Prevention of this would also make the converter more stable during start-up and transients. During load transients, the converter may attempt to keep the FET on for more than one half the operating frequency which tends to cause subharmonic oscillations in the circuit.

Another problem of the known converter is overdriving FET 5 at turn-on, since at turn-on $V_o$ is very low compared to the normal operating reference voltage 17.

THIS INVENTION

This invention incorporates in the general design of the known converter four circuit elements which meet the foregoing deficiencies. The additions include blanking during the undesired spikes found in switching FET 5 at high frequency and high current. A low-load system detects low output current levels and overrides the normal switching. Another system limits FET 5 on time to one half of the clock 33 frequency. A ramp reference voltage 15 is added as a second input to amplifier 13, with $V_o$ being compared to the lower of the ramp voltage 15 or the operating reference 17. These provide protection of FET 5 and the power train and stabilize the converter during start-up and load transients.

The early turn off problem is removed by the addition of pulse circuit 39, which prevents latch 29 from being reset until a fixed amount of time passes after the setting of latch 29. This allows a low pass filter to be eliminated, which allows for minimum detection time from current sense 25. The pulse width from circuit 39 is initiated by clock 33 and the duration of the blanking pulse of circuit 39 is selected to match the duration of the spike in the FET 5 sense response. This defines a minimum on time of FET 5 with respect to comparator 19 to the blanking pulse width since FET 5 can not be turned off by comparator 19 during this time. The low-load control comparator 21 discussed next may turn off FET 5 sooner, but that is desirable.

Low-load compensation is done by comparing the output of amplifier 13 signal to a fixed reference voltage 23, with a high output resetting latch 29. When $V_o$ is high, as it is at low load, FET 5 is not allowed to be switched on every cycle and thus the average operating frequency of the converter is lowered. The output voltage does have a saw tooth form, but is not allowed to increase into an unacceptable range. FET 5 is switched on enough to cause the output of amplifier 13 to oscillate about the low load control limit.

Additional protection of the power train and FET 5 is provided by automatically resetting latch 29 at 50 percent of the clock cycle by adding delay 35, operating off clock 33 and resetting latch 29 after one-half of the clock cycle. Under normal operation, latch 5 will already be reset at the 50 percent time. If a failure in the current detection circuitry occurs, FET 5 will not be allowed to be turned on and left on continuously. Most failures of this sort usually occur during fabrication and will cause a problem the first time the converter is tested. With this 50 percent shutdown scheme, a defective converter will not destroy FET 5 with no load on the output. Resetting latch 29 also limits the maximum change in duty cycle from one cycle to the next. This improves stability during transients and power on by limiting sudden changes in FET 5 current. This requires the duty cycle to be 50 percent or less, which limits the output voltage to be equal to or less than the bulk supply voltage.

The ramp reference 15 is linear, starting at zero volts at turn on (generated across a capacitor by driving a constant current into a capacitor). At turn-on amplifier 13 produces a signal representative of the difference of $V_o$ and ramp reference 15, thus preventing the output of amplifier 13 from being very high.

OTHER CONSIDERATIONS AND ALTERNATIVES

Because of current capacity requirements, most of the circuit of a typical implementation of this invention as shown will be PNP devices. For best operation, comparator 19 desirably will be a NPN device, which is faster. Transformation of signals for such purpose is a matter of circuit detail not forming a part of this invention.

Figure 2:
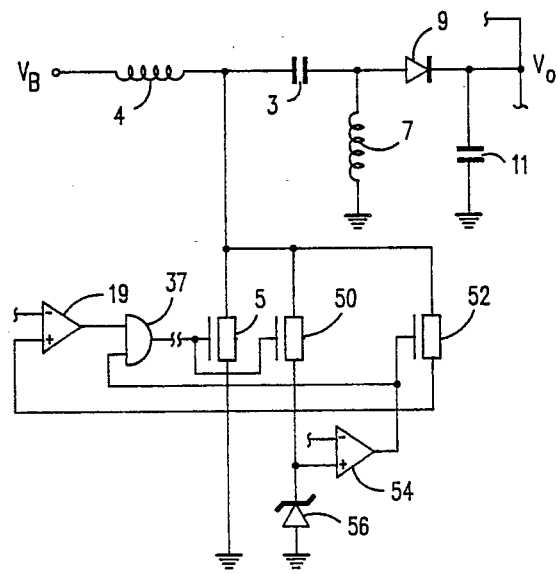

FIG. 2 shows an alternative power FET 5 current sensing system. Elements in FIG. 2 identical to those of FIG. 1 have the same reference numerals in both. Once again, sense FET 50 and sense FET 52 are actually each a relatively small number of field effect transistors located with and identical in form to a much larger number of field effect transistors forming power FET 5. Sense FET 50 is gated on with the same signal which gates on power FET 5. Sense FET 52 has its drain connected to the plus input of comparator 19. The sources of sense FET 50 and sense FET 52 are connected to the junction of inductor 1 and capacitor 3.

When FET 50 is gated on, it experiences spike voltages from parasitic effects. The drain of FET 50 stays high from those parasitic effects and comparator circuit 54, one input of which is connected to the drain of FET 50, stays at a value which keeps gate 37 at a status which blocks any signal from comparator 19. Zener diode 56 is connected to the drain of FET 50 and to ground, with its junction to FET 50 being an input to comparator 54, the other input to comparator 56 being a reference voltage. Zener diode 56 has a high enough breakdown voltage to have its value control the output of comparator 54 during the parasitic effects.

When the parasitic effects have dissipated, the voltage at zener diode 56 drops to ground and the output comparator 54 changes state. This output gates sense FET 52 on, and FET 52 provides a signal representative of the current through power FET 5 to the plus input of comparator 19.

The advantage of this arrangement is that gate 37 is blocked on only so long as the parasitic disturbances at the sense FET 50 exist, rather than for a preset time. This requires a circuit which can withstand having voltage from the junction of inductor 1 and capacitor 3 across FET 50.

Circuit details not necessary to the understanding of this invention and within the skill of the circuit-design art are omitted. Variations within the spirit and scope of this invention will be apparent.

We claim:

1. A first converter circuit comprising an input from a direct current voltage source, an inductor connected from said input to a first node, a second converter circuit connected to said first node and having a direct current voltage output for a load, a switch connected from said first node in parallel with said output, means to produce a first control signal corresponding to the current carried by said switch, means to produce a second control signal corresponding to the difference of the voltage at said output and a first reference signal corresponding to a voltage from said output lower than a first predetermined level, means to produce a third control signal when said second control signal is less than a second predetermined level with respect to a second reference signal corresponding to a voltage from said output higher than a third predetermined level, means to produce a fourth control signal when said first control signal is at least at a fourth predetermined level with respect to said second control signal, a clock source for producing a clock signal, means to produce a displaced clock signal displaced less than one cycle from said clock signal, a latch having a set input and at least one reset input, means controlling said switch in response to the status of said latch so that said switch is closed when said latch is set and said switch is open when said latch is reset, means to produce a fifth control signal at each initial closing of said switch, means responsive to said fifth control signal to temporarily inhibit said fourth control signal from resetting said latch, and means connecting said clock to said set input to set said latch, means connecting said fourth control signal to said reset input to reset said latch when not temporarily inhibited in response to said fifth control signal, means connecting said third control signal to said reset input to reset said latch, and means connecting said displaced clock signal to said reset input to reset said latch.

2. The converter circuit as in claim 1 in which said means to produce a second control signal has an input to receive a signal increasing with time beginning with the turn on of said converter circuit and produces an output corresponding to the difference of said voltage at said output and the lower of said first reference signal and said signal increasing with time.

3. A first converter circuit comprising an input from a direct current voltage source, an inductor connected from said input to a first node, a second converter circuit connected to said first node and having a direct current voltage output for a load, power field effect transistor system connected from said first node in parallel with said output, means to produce a first control signal corresponding to the current carried by said switch, an amplifier to produce a second control signal corresponding to the difference of the voltage at said output and a first reference signal corresponding to a voltage from said output lower than a first predetermined level, a comparator to produce a third control signal when said second control signal is less than a second predetermined level with respect to a second reference signal corresponding to a voltage from said output higher than a third predetermined level, a comparator to produce a fourth control signal when said first control signal is at least at a fourth predetermined level with respect to said second control signal, a clock source for producing a clock signal, means to produce a displaced clock signal displaced less than one cycle from said clock signal, a latch having a set input and at least one reset input, means switching said power system in response to the status of said latch so that said power system is off when said latch is set and on when said latch is reset, means to produce a fifth control signal at each initial closing of said switch, means responsive to said fifth control signal to temporarily inhibit said fourth control signal from resetting said latch, and means connecting said clock to said set input to set said latch, means connecting said fourth control signal to said reset input to reset said latch when not temporarily inhibited in response to said fifth control signal, means connecting said third control signal to said reset input to reset said latch, and means connecting said displaced clock signal to said reset input to reset said latch.

4. The converter circuit as in claim 3 in which said amplifier has an input to receive a signal increasing with time beginning with the turn on of said converter circuit and produces an output corresponding to the difference of said voltage at said output and the lower of said first reference signal and said signal increasing with time.

* * * * *